United States Patent [19]

Ohte et al.

[11] 3,751,675

[45] Aug. 7, 1973

[54] ANALOG CONTROL SYSTEM WITH PLURAL STATES HAVING A COMMON POWER SOURCE ARRANGEMENT AND MEANS FOR ELIMINATING ERROR VOLTAGES ARISING THEREFROM

[75] Inventors: Akira Ohte; Minoru Tamuki, both of Tokyo, Japan

[73] Assignee: Yokogawa Electric Works, Ltd., Tokyo, Japan

[22] Filed: Oct. 21, 1971

[21] Appl. No.: 191,413

[30] Foreign Application Priority Data

Oct. 27, 1970 Japan .................................. 45/94439

[52] U.S. Cl. .................................. 307/34, 340/147 R

[51] Int. Cl. .................................. H02j 13/00

[58] Field of Search .................. 307/31, 33, 34, 52, 307/18; 340/147 R; 179/170 J

[56] References Cited

UNITED STATES PATENTS 3,629,548 12/1971 Rygiol .................................. 307/34 X

OTHER PUBLICATIONS

Kepco Power Supply Handbook, 1965, p. 37–39.

*Primary Examiner*—Robert K. Schaefer
*Assistant Examiner*—William J. Smith
*Attorney*—Howard M. Bollinger et al.

[57] ABSTRACT

A control system of the type including a plurality of stages each drawing power from power lines connected to a common power source, characterized by an input circuit in each of said stages for receiving input signals and for eliminating error voltage components arising from the line resistance of said power lines, thereby affording accurate signal processing. Each input circuit comprises an operational amplifier drawing power from the power lines, series resistors for applying the input signal to the differential signal input terminals of the operational amplifier, and a resistor for negatively feeding back a portion of the operational amplifier output to one signal input terminal. A reference voltage derived from the power source is applied through a resistor to the other signal input terminal. The two input signal resistors are made equal and the feedback and reference voltage resistors are made equal and as a result the operational amplifier output has no error components arising from power line resistance or from bias applied to the input signal. The input circuit may be arranged to subtract a base component voltage from the input signal according to two different arrangements. The amplification provided by the operational amplifier is determined by the ratio of the feedback or reference voltage resistors to the signal input resistors, or by the ratio of a voltage divider at the operational amplifier output provided to feed back a portion of the output through said feedback resistor.

23 Claims, 6 Drawing Figures

ANALOG CONTROL SYSTEM WITH PLURAL STATES HAVING A COMMON POWER SOURCE ARRANGEMENT AND MEANS FOR ELIMINATING ERROR VOLTAGES ARISING THEREFROM

BACKGROUND OF THE INVENTION

1. Field of the Invention

This invention relates to analog control systems of the type typically used for process control wherein precise transmission and processing of signals is necessary to assure precision of control. More particularly the invention relates to control systems comprising a plurality of stages, for example computing and controlling stages, each of which draws power from a common power source. The common power source simplifies circuitry, increases system reliability, and permits substitute battery power to be provided during power failure. Because of these advantages, common power source control systems are widely is use.

2. Description of the Prior Art

In common power source control systems, input signals to the respective stages of the system are typically referred to a reference line to which the power source is also referred. That is, the input signal and power source have reference levels in common. In this arrangement a voltage drop due to resistance in the common power line is introduced into the input signal, and this error component prevents precise control.

SUMMARY OF THE INVENTION

Objects of the present invention are to provide a control system of the type in which a plurality of stages each draw power from a common power source by means of power lines, in which error voltages due to resistance of the power lines are eliminated, in which input signals may float without introducing error, and in which accurate signal processing is therefore achieved.

According to the invention an input circuit is provided in each of said stages for receiving the input signal thereto. The input circuits each comprises an operational amplifier having its power input terminals connected to the power lines, and means for applying the input signal to the differential signal input terminals of the operational amplifier. Feedback means return a portion of the operational amplifier output to one of the signal input terminals. The input circuit further has means providing a reference voltage and means for applying the reference voltage to the other of the signal input terminals. The input circuit, according to this arrangement, thus operates with reference to said reference voltage and receives said input signal as a differential signal separated from the power source reference.

In further aspects, series resistors of equal value provide the means applying the input signal to the operational amplifier, the feedback means is a resistor, and a series resistor equal in value to the feedback resistor provides the means applying the reference voltage to the operational amplifier. Under these conditions, the output of the operational amplifier, taken with reference to the reference voltage, has no components due to resistance of the power lines, and no component due to biasing of the input signal in relation to the power source reference.

In another aspect the input circuit is arranged to subtract a base component voltage from the input signal. The input circuit includes means providing a base component voltage, and means such as series resistors for applying this voltage to the operational amplifier signal input terminals. The operational amplifier then subtracts the base component from the input signal. Alternatively, subtraction of a base component voltage is provided by supplying a divided portion of said reference voltage to the operational amplifier signal input terminal, the remaining portion of the reference voltage being proportioned to the base component voltage according to the amount of signal amplification provided by the operational amplifier.

In still another aspect of the invention, the amount of amplification provided by the operational amplifier is controlled by providing a voltage divider circuit at the output of the operational amplifier, and feeding back a divided portion of the output through the feedback means to the amplifier signal input terminal. The amplification provided by the operational amplifier is then related to the voltage divider ratio.

Other objects, aspects and advantages of the invention will be pointed out in, or be apparent from, the detailed description hereinbelow, considered together with the following drawings.

DESCRIPTION OF THE PREFERRED EMBODIMENTS

Figure 1:
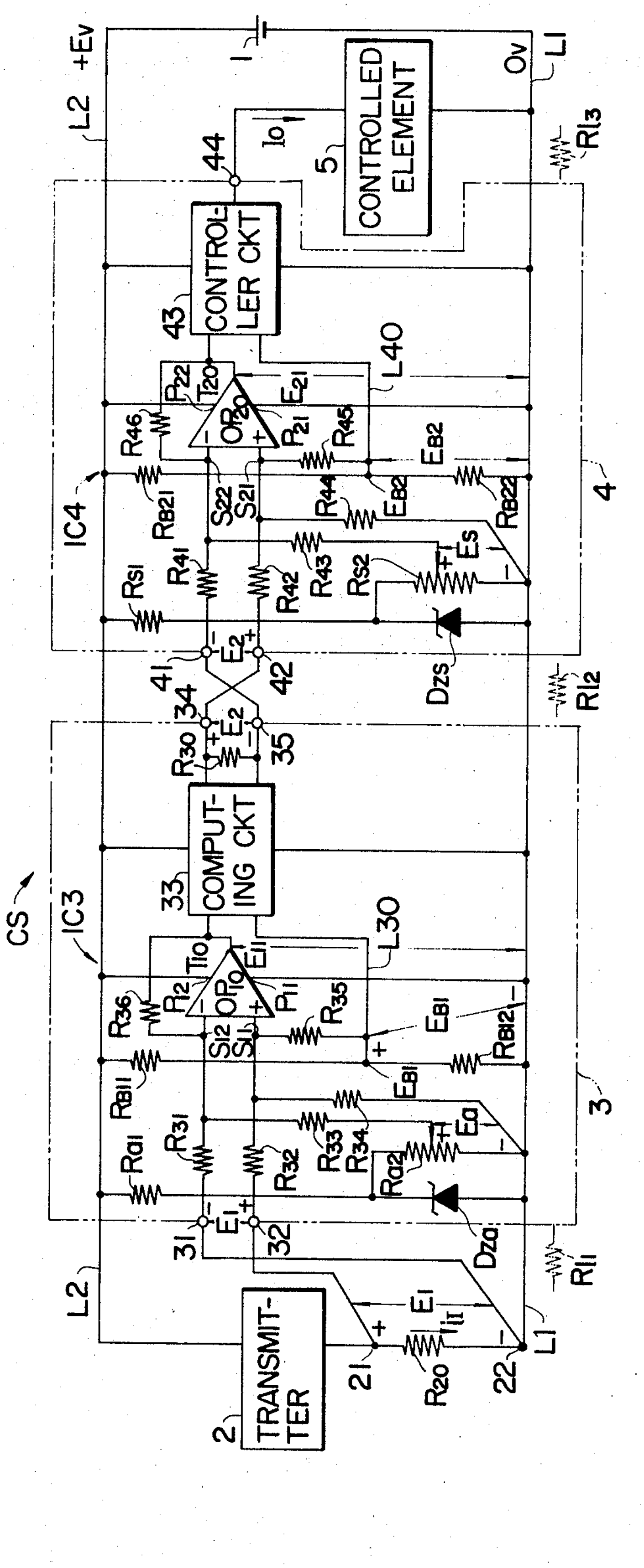
FIG. 1 is a schematic diagram of an analog control system according to the present invention.

FIG. 1 illustrates a control system CS according to the invention, in which a common DC power source 1 supplies power to a two-wire transmitter 2, a computing stage 3, and controller stage 4 by means of power lines L1 and L2.

The transmitter 2, located at the site of the controlled process, supplies a signal current *il* to a resistor R20, located typically in a central control room. Resistor R20 develops a signal voltage E1 across its terminals 21 and 22. The signal voltage E1 is applied to input terminals 31, 32 of computing stage 3 which processes the signal in a preselected manner, as by subtracting a base component and extracting the square root, and provides at its output terminals 34, 35 a voltage E2. The voltage E2 serves as the input signal at input terminals 41, 42 of controller stage 4 which processes the signal in a preselected manner such as to provided PID control, the controller stage providing through its output terminal 44 an output current IO which drives a controlled element 5.

In accordance with the present invention, computing stage 3 and controller stage 4 are provided with input circuits IC3 and IC4 which receive input signals E1 and E2 respectively and supply a signal to computing circuit 33 and controller circuit 43 respectively.

Input circuits IC3 and IC4 are similar in structure and therefore the following description of input circuit IC3 will serve also to describe input circuit IC4.

Input circuit IC3 comprises an integrated circuit operational amplifier OP10 which has its power terminals P11 and P12 connected respectively to power lines L1 and L2 to supply DC power thereto. As will be explained in greater detail below, the operational amplifier OP10 is operated in relation to a reference voltage EB1 the level of which is intermediate the O*v*. and E*v*. levels of power source 1, and therefore these power source levels stand at a negative and positive potential with respect to the operational amplifier OP10 to provide the relative negative and positive power sources necessary for its operation. A single power source is thus utilized to provide both negative and positive power supplies.

As shown in FIG. 1, the input signal E1 is applied to the positive and negative differential signal input terminals S11 and S12 of operational amplifier OP10 through series resistors R31 and R32. A base component voltage Ea is applied to the signal input terminals S11 and S12 through series resistors R33 and R34. A reference voltage EB1 is applied through series resistor R35 to the positive signal input terminal S11 of operational amplifier OP10, and a feedback resistor R36 feeds back a portion of the output of operational amplifier OP10 to its negative signal input terminal S12.

As shown, base component voltage E*a* and reference voltage EB1 are derived from power source 1. Base component voltage E*a* is derived from a circuit which connects resistor Ra1 and Zener diode Dza between power lines L1 and L2. A potentiometer R*a* 2 divides the voltage across the Zener diode Dza to provide base component voltage Ea referred to the level of power line L1. Reference voltage EB1 is derived from power source 1 at the junction of voltage divider resistor RB11 and RB12 connected between power lines L1 and L2.

Figure 2:
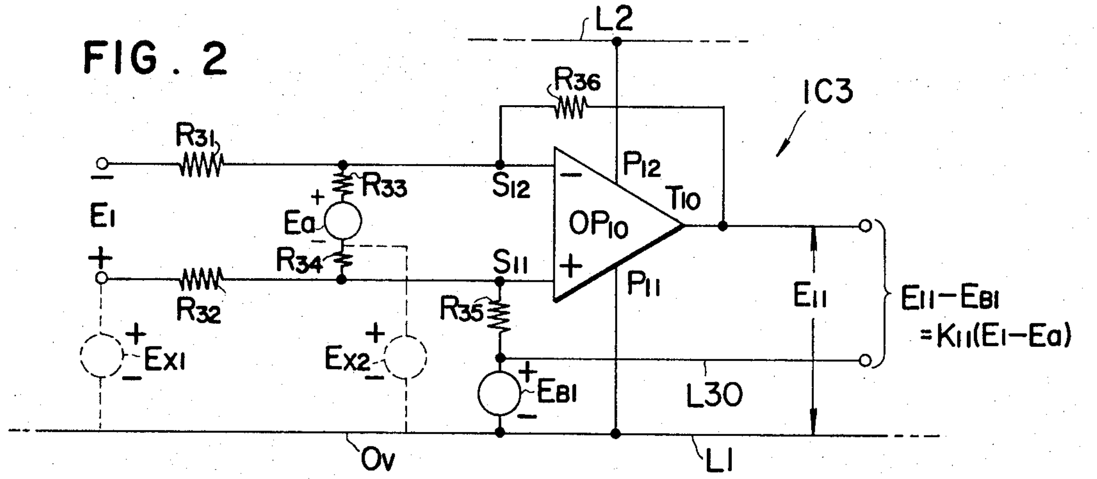
FIG. 2 is a simplified diagram representing for analytical purposes an input circuit as illustrated in FIG. 1.

The behavior of input circuit IC3 can be more readily understood and analyzed with reference to the simplified diagram of FIG. 2, in which the voltages Ea and EB1 are represented by independent sources. Input circuit IC3 supplies a voltage E11, measured between the output terminal T10 of operational amplifier OP10 and line L1, which is given by the following equation:

$$E11 = (R34\ R35/R31\ R33)\ QE1 - (R36/R33)\ Ea + (R\ 32\ R34/R31\ R33)\ EB1 \quad (1)$$

$$+ ](R34\ R35/R31\ R33)\ Q - R36/R31\ ]\ Ex1$$

$$+ ](R32\ R35/R31\ R33)\ Q - R36/R33\ ]\ Ex2$$

where $Q = (R31\ R33 + R33\ R36 + R36\ R31)\ /\ (R32\ R34 + R34\ R35 + R35\ R32)$ In equation 1, the term Ex1 represents the potential difference between the reference side of input signal E1 and the reference of O*v*. at power source 1, and is symbolically shown in FIG. 2 in dotted lines as a voltage source. This potential difference Ex1 is due to voltage drops in line L1, such as are produced by current flowing in the resistances RL1, RL2 and RL3 symbolically shown in FIG. 1 to represent line resistances. Similarly the term Ex2 denotes the difference in potential between the reference side of base component voltage E*a* and the reference at O*v*. of power source 1. The voltages Ex1 and Ex2 are error voltages which, if processed by the control system CS, will result in erroneous and imprecise control. (A similar potential difference exists between the reference side of reference voltage EB1 and the reference at O*v*. of the power source, but this term can be neglected because input circuit IC3 refers its output to line L30 at reference voltage EB1, passing to computing circuit 33 the voltage E11 −EB1. Accordingly, this potential difference is cancelled out by subtraction.)

If the following condition exists, $$R31 = R32 = R33 = R34 = R1$$
$$R35 = R36 = K11\ R1 \quad (2)$$

then, $$E11 = K11 = (E1 - Ea) + EB1 \quad (3)$$

Equation 3 is not dependent on the terms Ex1 and Ex2 and thus it is possible by use of input circuit IC3 to remove error components ascribable to line resistance. Moreover, the independence of E11 on the term Ex1 means that the input signal E1 may float, or be biased at an arbitrary level above the reference supplied by line L1. Therefore, for example, the input signal E1 could be provided by a resistor located between transmitter 2 and line L2 if so desired.

As noted above, the signal supplied by input circuit IC3 is referred to reference voltage EB1 and therefore includes only the term K11 (E1 −E*a*). The amplification factor K11 can be varied, if desired, by changing the ratio of resistor R35 or R36 to resistor R31 or R32. The base component voltage E*a* can be varied by changing the setting of potentiometer R*a*2 and, if desired, voltage E*a* may be made equal to zero so that no base component will be subtracted.

Figure 3:
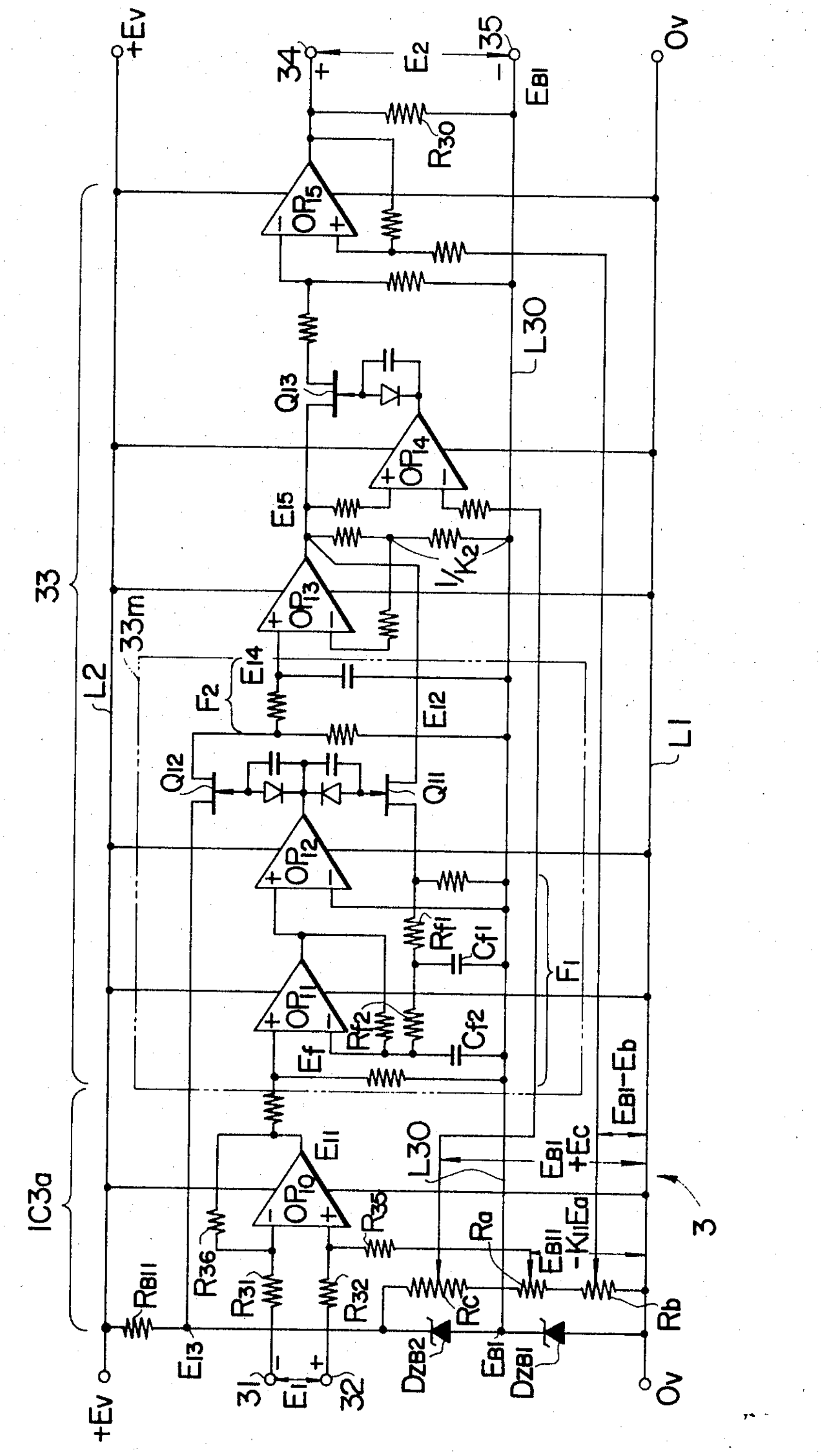
FIG. 3 is a schematic diagram illustrating the components of the computing stage of the control system of FIG. 1.

FIG. 3 illustrates in detail an example of computing stage 3 which contains a modified input circuit IC3a and a computing circuit 33 arranged to provide the square root of the signal supplied thereto.

Figure 4:
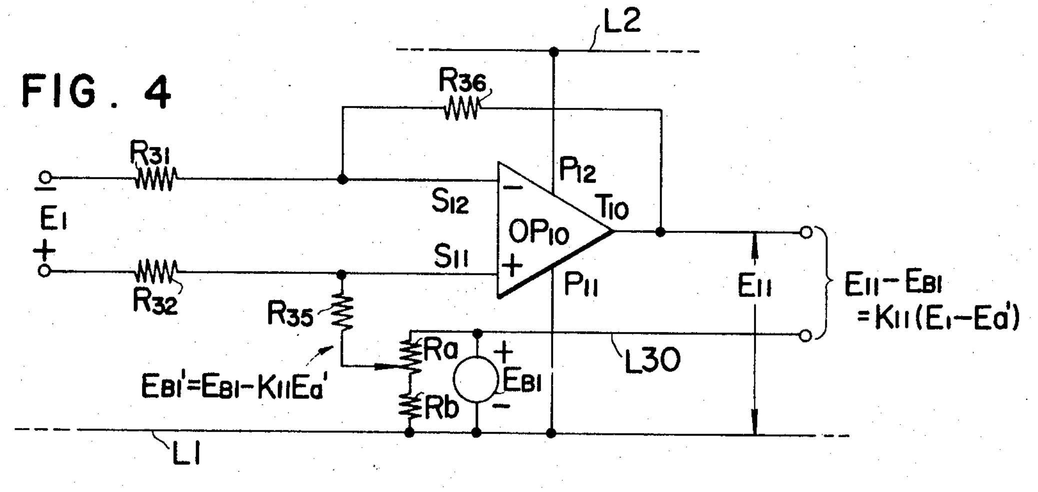
FIG. 4 is a simplified diagram of a modified input circuit as shown in FIG. 3.

The modified input circuit IC3*a* shown complete in FIG. 3 and in simplified form in FIG. 4 is arranged to subtract a base component E*a*' from input signal E1 by means of a circuit arrangement differing from that illustrated in FIGS. 1 and 2. As shown in FIGS. 3 and 4, the voltage divider means providing voltage E*a* and resistors R33 and R34 are omitted from modified input circuit IC3*a*. Moreover, reference voltage EB1 is applied to input terminal S11 of the operational amplifier OP10 through a voltage divider, comprising potentiometers R*a* and R*b*, which supplies a divided portion EB1' of the reference voltage EB1 to the operational amplifier input terminal S11. The portion EB1' is selected so that $$EB1' = EB1 - K11Ea' \quad (4)$$

the output E11 is then given by $$E11 = K11\ (E1 - Ea') + EB1 \quad (5)$$

Accordingly, subtraction of base component $Ea'$ is accomplished, and with fewer circuit components than required by the arrangement of FIGS. 1 and 2.

Modified input circuit IC3*a* derives reference voltage EB1 from a Zener diode DzB1 and includes, in addition, resistors R*b* and R*c* and Zener diode DzB2, and resistor RB11 for the purpose of providing bias voltages Eb, EC and E13 in computing circuit 33.

Figure 5:
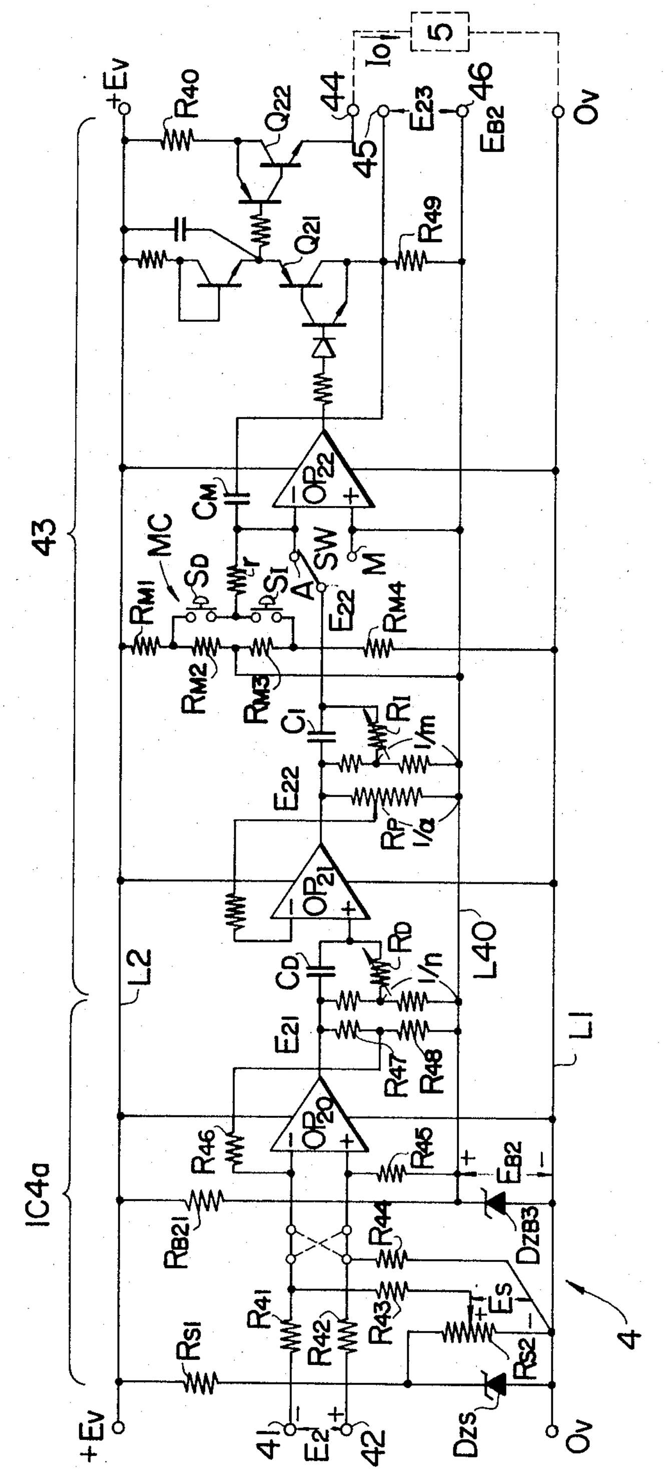
FIG. 5 is a schematic diagram of the controller stage of the control system of FIG. 1.

FIG. 5 illustrates in detail an example of controller stage 4 which contains another modified input circuit IC4*a* and a controller circuit 43 arranged to provide PID control.

Figure 6:
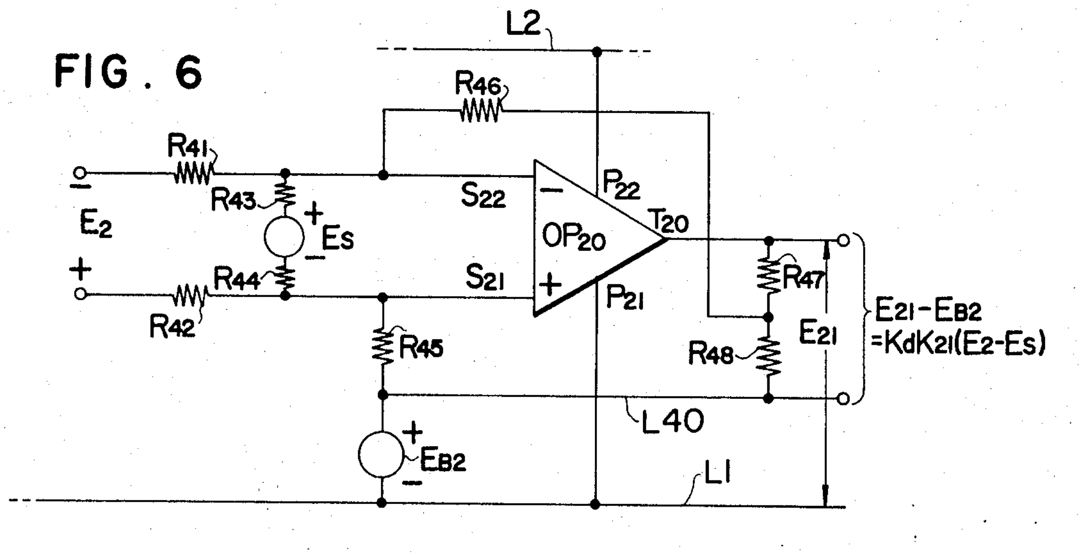
FIG. 6 is a simplified diagram of another modified form of input circuit as shown in FIG. 5.

Modified input circuit IC4*a*, shown in simplified form in FIG. 6, differs from input circuit IC3 or IC4 by providing a modified feedback arrangement for operational amplifier OP20. A voltage divider comprising resistors R47 and R48 is connected between the operational amplifier output terminal T20 and the reference line L40 at reference voltage EB2. This voltage divider divides the voltage E21 − EB2 and feeds back a divided portion through resistor R46 to the negative input terminal of operational amplifier OP20. Defining the voltage divider ratio as $$R48 \,/\, (R47 + R48) = 1/Kd \qquad (6)$$

it can be seen by analogy from equation 3 that the voltage $E21$ is given by $$E21 = Kd\ K21\ (E2 - Es) + EB2$$

where R41 = R42=R43=R44=R45/K21=R46/K21 (7)

By equalizing the values of resistors R41 through R46, then K21 = 1 and the amplification factor of input circuit IC4a is determined solely by the voltage divider ratio *Kd*. The amplification factor thus can be arbitrarily determined and the common mode input voltage to the operational amplifier OP20 is unchanged and the circuit can be more stably operated than in the arrangements previously described wherein the coefficient K11 or K21 is determined by changing the value of feedback resistors R36 or R46. Adjustment of the amplification factor in this manner can be carried out in an input circuit in which a base component is subtracted either as in input circuit IC3 or as in modified input circuit IC3*a*.

In modified input circuit IC4*a* reference voltage EB2 is derived directly from a Zener diode DzB3 connected in series with a resistor RB21 between power lines L1 and L2.

Referring again to FIG. 3, the computing circuit 33 of computing stage 3 is arranged to compute the square root of the signal supplied by input circuit IC3*a*. Computing circuit 33 comprises an oscillating circuit 33 m providing time-division modulation and including operational amplifiers OP11 and OP12, field effect transistor switches Q11 and Q12, a multistage RC network F1, and a smoothing network F2. Operational amplifiers OP11 and OP12 compare voltage E11−EB1 with the feedback voltage Ef developed by RC network F1 by applying voltage E12 through switch Q11. Switches Q11 and Q12 turn on when E11−EB1 is greater than Ef and turn off when E11−EB1 is less than E*f*. Accordingly, the loop consisting of operational amplifiers OP11, OP12, switch Q11, and network F1 oscillates with a total cycle time T determined by the characteristics of the network F1. The oscillation frequency is adjusted to several kilohertz. The ratio of on time t to the total cycle time T can be expressed as $$t/T = Ef/E12 = (E11 - EB1)\ /\ E12 \qquad (8)$$

Accordingly reference voltage E13 is turned on and off by Q12 and is converted into a pulse voltage with a width $t$ and an amplitude E13. After smoothing by network F2, the resulting mean value of voltage E14 at the output of circuit 33m is given by $$E14 = (t/T)\ E13 = K11\ (E1 - Ea)\ E13\ /\ E12 \qquad (9)$$

This output voltage E14 is applied to the positive signal input terminal of operational amplifier OP13 which acts as a buffer for operational amplifier OP15 and multiplies the signal by a constant K12 determined by the ratio of the voltage divider at the output of OP13. Accordingly, the output E15 is $$E15 = K11\ K12\ (E1 - Ea)\ E13/E12 \qquad (10)$$

Output E15, however, is applied as voltage E12 to the drain of transistor Q11 in circuit 33*m*. Since E12 = E15, $$E15 = \sqrt{K11\ K12\ (E1 - Ea)\ E13} \qquad (11)$$

Output E15 is applied to operational amplifier OP15 through field effect transistor Q13 and operational amplifier OP14 arranged to provide low level cutoff for small amplitude signals less than the set value EC determined in input circuit IC3*a*, thereby to eliminate drift in the operational amplifier OP15. The operational amplifier OP15 is biased by base voltage E*b*, also derived in input circuit IC3*a*, which adds a base voltage E*b* to the signal so that the output voltage E2 is given by $$E2 = \sqrt{K11\ K12\ E13\ (E1 - Ea + Eb)} \qquad (12)$$

The square root operation performed by computing circuit 33 is typical of the sort of control system operations associated with the present invention. Other such operations such as multiplying or dividing, which can be performed in the same circuit by using E12 or E13 as signal voltages, are also typical.

The output signal E2 of computing circuit 33 floats at a level EB1 above the line reference L1, but as explained previously, the input circuit IC4 in controller stage 4 is unaffected by this bias and supplies a signal E21 to controller circuit 43 without error components.

The controller circuit 43 in contoller stage 4 is illustrated in FIG. 5 as a PID type control. The output E21-EB2 of operational amplifier OP20 is differentiated in the circuit containing resistor RD and capacitor CD, is subjected to proportional gain in the circuit comprising operational amplifier OP21 and voltage divider resistor RP, and the output signal E22 of operational amplifier OP21 undergoes an integrating operation in the circuit comprising capacitor CI and resistor RI, capacitor CM and operational amplifier OP22. An output voltage E23 is obtained across resistor 49 by way of output transistor Q21. This output voltage E23 is referred to line L40 at the voltage EB2 and is thus unsuitable for application to controlled element 5. Accordingly, transistor Q22 is provided as a level shifting means to shift the output voltage down to obtain output current 10 referenced to power line L1.

Controller circuit 43 has an automatic control mode when switch SW is in position A and a manual control mode when the switch in position M. In changing to manual control, the capacitor Cm maintains its charge and output voltage E23 maintains the value achieved at the time of switching. When the manual control switches SD or SI of the manual controller are closed, the voltage across capacitor Cm is changed and the value of output voltage 23 is accordingly controlled manually. When neither switch SI nor SD is closed output voltage 23 remains constant. Thus, when switch SW returns to automatic control, the output voltage 23 is not changed abruptly.

Although controller circuit 43 is disclosed as a PID controller, other control stages may be used. Other examples of analog control circuits to which the present invention is applicable include recording meters, integrators, annuciators, and so forth.

Although specific embodiments of the invention have been disclosed herein in detail, it is to be understood that this is for the purpose of illustrating the invention and should not be construed as necessarily limiting the scope of the invention, since it is apparent that many changes can be made to be disclosed structures by those skilled in the art to suit particular applications.

I claim:

1. A control system of the type including a plurality of series connected stages for conveying or processing a control signal, each stage drawing power from a common power source connected to the respective stages by means of power lines, the control system being characterized by an input circuit in each of said stages for receiving the input signals to the respective stages, each of said input circuits comprising:

an operational amplifier having power input terminals connecting with said power lines to supply electrical power to the amplifier, differential signal input terminals, and an output terminal, means for applying the input signal to said differential signal input terminals, means for negatively feeding back a portion of the operational amplifier output to one of the signal input terminals, means providing a reference voltage at a voltage between the potentials of said power lines, and means for applying the reference voltage to the other of the signal input terminals of the operational amplifier, said input circuit delivering its output between the operational amplifier output terminal and said reference voltage;

whereby said input circuit operates with reference to said reference voltage, and the operational amplifier receives relatively positive and negative voltage at its power input terminals from said power source lines.

2. A control system of the type claimed in claim 1 wherein said input circuit further comprises means for providing a base component voltage for subtraction from said input signal, and means for applying said base component voltage to said differential signal input terminals of said operational amplifier, whereby the output of said operational amplifier is a voltage subtracting said base component voltage from said input signal.

3. A control system of the type claimed in claim 1 wherein said means for applying the reference voltage to said other signal input terminal comprises means for dividing said reference voltage and for supplying a divided portion of said reference voltage to said other signal input terminal, whereby the output of said operational amplifier is a voltage subtracting from said input signal a base component voltage proportional to the remaining divided portion of the reference voltage.

4. A control system of the type claimed in claim 1 where said feedback means comprises means for dividing the operational amplifier output and for supplying a divided portion of the output to said one signal input terminal.

5. A control system of the type claimed in claim 1 wherein said means for applying the input signal to said differential signal input terminals comprises a first resistor in series with said one signal input terminal and a second resistor in series with said other signal input terminal, said input signal being connected between said resistors, said resistors being equal in value.

6. A control system of the type claimed in claim 1 wherein said means providing said reference voltage comprises means for deriving said reference voltage from said power source.

7. A control system of the type claimed in claim 6 wherein said deriving means comprises a voltage divider connected between said power lines.

8. A control system of the type claimed in claim 6 wherein said deriving means comprises a Zener diode connected between said power lines.

9. A control system of the type claimed in claim 1 wherein said means for applying said reference voltage to the signal input terminals includes a series resistor, and said feedback means includes a series resistor, said reference voltage resistor and feedback resistor being equal in value.

10. A control system of the type claimed in claim 1 wherein said means for applying the input signal to said differential signal input terminals comprises first and second resistors in series with respective ones of said signal input terminals, said resistors being equal in value, and wherein said means for applying the reference voltage to the other signal input terminal is a series resistor and said feedback means is a series resistor, said reference voltage and feedback resistors being equal in value, whereby the output of said operational amplifier is a voltage having no component arising from the line resistance in said power lines, or from bias applied to said input signal.

11. A control system of the type claimed in claim 10 further comprising means for providing a base component voltage for subtraction from said input signal, and means for applying said base component voltage to said differential signal input terminals of said operational amplifier, said applying means comprising resistors connected in series with respective ones of said signal input terminals, said resistors being equal in value to the resistors applying said input signal.

12. A control system of the type claimed in claim 10 wherein said means for applying the reference voltage to the other signal input terminal comprises means for dividing said reference voltage and for supplying a divided portion of said reference voltage to said signal input terminal, whereby the output of said operational amplifier is a voltage subtracting from said input signal a base component voltage proportional to the remaining divided portion of the reference voltage.

13. A control system of the type claimed in claim 12 wherein said remaining portion of the reference voltage is equal to KE*a* where E*a* is said base component voltage and K is the amplification provided by said operational amplifier.

14. A control system as claimed in claim 10 wherein said feedback means comprises means for dividing the operational amplifier output and for supplying a divided portion of the output to said one signal input terminal, whereby the ratio of said dividing means controls the amplification of said operational amplifier.

15. A control system as claimed in claim 14 wherein said dividing means comprises a resistive voltage divider having a ratio of Kd and wherein said feedback resistor equals said resistors applying said input signal whereby the output of said operational amplifier is proportional to Kd.

16. A control system of the type claimed in claim 1 wherein one of said stages is a computing stage comprising, in addition to said input circuit, a computing circuit receiving the output of said input circuit, said output being referred to the level of said reference voltage, and the computing circuit having power input terminals connecting with said power lines to supply electrical power thereto, whereby said computing circuit receives, in comparison to said output, relatively positive and negative voltages at its power input terminals from said power source lines.

17. A control system of the type claimed in claim 16 wherein said computing circuit is of the time-division modulation type and comprises an oscillating circuit including operational amplifier means receiving at one of its input terminals the output of said input circuit, first switch means driven by the output of the operational amplifier means, negative feedback means including an RC circuit for connecting the first switch means to the other input terminal of the operational amplifier means, and means for referring the signal applied to said other input terminal to the level of said reference voltage, the signal applied to said other input terminal of the operational amplifier means being switched on and off by said first switch means; and second switch means driven by said operational amplifier means for generating an oscillating signal, and means for referring said oscillating signal to the level of said reference voltage.

18. A control system of the type claimed in claim 1 wherein one of said stages is a controller stage comprising, in addition to said input circuit, a controller circuit receiving the output of said input circuit, said output being referred to the level of said reference voltage, and the controller circuit having power input terminals connecting with said power lines to supply electrical power thereto, whereby said controller circuit receives, in comparison to said output, relatively positive and negative voltages at its power input terminals from said power source lines.

19. A control system of the type claimed in claim 18 wherein said controller circuit comprises means for processing the output of said input circuit, operational amplifier means arranged to receive the processed output of said input circuit and connected through an output circuit to provide an output control voltage, a feedback circuit for said operational amplifier including a capacitor, a changeover switch having a position corresponding to an automatic mode of control in which said feedback circuit and said processed output are connected to an input of said operational amplifier means, and having a position corresponding to a manual mode of control in which said processed output is disconnected from said input terminal, means connected to the input terminal of the operational amplifier means and operable in the position of said switch corresponding to manual control, for manually controlling said operational amplifier and said output control voltage, said manual control means being arranged to increase or decrease the voltage of said capacitor, whereby when said switch is returned to the automatic mode of control, the output control voltage is not changed abruptly.

20. A control system of the type including a plurality of series-connected stages for conveying or processing a control signal, each stage drawing power from a common power source connected to the respective stages by means of power lines, the control system being characterized by an input circuit in each of said stages for receiving the input signals to the respective stages, each of said input circuits comprising:

an operational amplifier having power input terminals connecting with said power lines to supply electrical power to the amplifier, differential signal input terminals, and an output terminal.

signal input resistors in series with said signal input terminals for applying the input signal to said differential signal input terminals, a feedback resistor for negatively feeding back a portion of the operational amplifier output to the negative signal input terminal of the operational amplifier, means deriving a reference voltage from said power source at a voltage between the potentials of said power lines, a reference voltage resistor for applying the reference voltage to the other signal input terminal of the operational amplifier, said signal input resistors being equal to each other and said feedback resistor and reference voltage resistor being equal to each other, said input circuit delivering its output between the operational amplifier output terminal and said reference voltage, whereby said output voltage has no component arising from line resistance of the power lines, or from bias supplied to the input signal.

21. A control system as claimed in claim 20 further comprising means deriving a base component voltage from said power source, base voltage resistors in series with said signal input terminals for applying said base component voltage thereto, said base component resistors being equal to said signal input resistors, whereby said output voltage has no component arising due to derivation of said base component voltage from said power source through said power lines.

22. A control system as claimed in claim 20 further comprising means for dividing said reference voltage and for supplying a divided portion of said reference voltage through said reference voltage resistor, whereby the output of said operational amplifier is a voltage subtracting from said input signal a base component voltage proportional to the remaining divided portion of the reference voltage, said remaining divided proportion being equal to KEa where Ea is the base component voltage and K is the amplification factor of said operational amplifier.

23. A control system as claimed in claim 20 further comprising voltage divider means for dividing the operational amplifier output and for supplying a divided portion of the output to said feedback resistor, the voltage divider ratio being equal to Kd and said feedback resistor and said signal input resistors being equal, whereby the output voltage is proportional to Kd.

* * * * *